S. C. SHELLER.
Improvement in Cultivators.
No. 123,583. Patented Feb. 13, 1872.
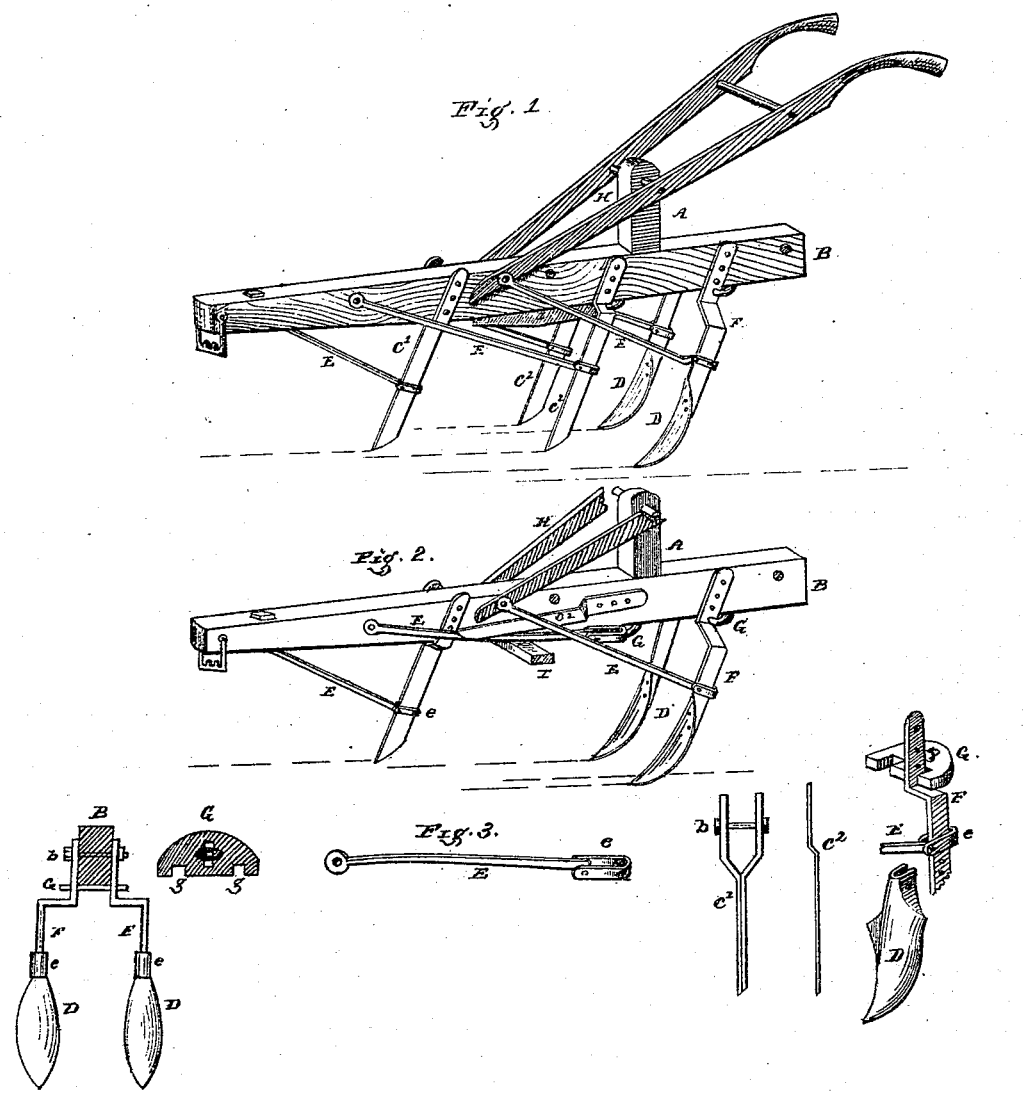
Witnesses.
M. Dreisbach
Daniel Shaffer.
Inventor.
S. C. Sheller.

123,583

UNITED STATES PATENT OFFICE.

SAMUEL C. SHELLER, OF LEWISBURG, PENNSYLVANIA, ASSIGNOR TO ALFRED S. SHELLER, OF SAME PLACE.

IMPROVEMENT IN CULTIVATORS.

Specification forming part of Letters Patent No. 123,583, dated February 13, 1872.

*To all whom it may concern:*

Be it known that I, SAMUEL C. SHELLER, of Lewisburg, in Union county, and State of Pennsylvania, have invented a Combined Cultivator, Deep-Tiller and Subsoiler; and I do hereby declare that the following is a full description thereof, reference being had to the accompanying drawing making a part of this specification, in which—

Figure 1 is a perspective view of the three cutters and two shovels, shown down. Fig. 2 shows the two central cutters, $c^2$, swung up, and with the braces (supported on the sides of the beam on a turn-bar, I,) attached centrally beneath the beam B, forming the cultivator. Fig. 3 illustrates the several parts detached.

The object of my invention is to adapt the several cutters and shovels to a single beam, so as to dispense with side beams, and to provide adjustable stay-plates and braces to hold them firmly in place, yet so hinged and connected that the hinged and adjustable cutters and shanks or shovels can be swung up out of the way, and supported on the sides of the beam on a turn-bar provided for the purpose, thus making it readily convertible from one use to that of another.

A brief explanation will enable others skilled in the art to make and use my invention.

Figure 1 shows the single beam B with its standard A and handles H as in the ordinary plow, differing, however, in the arrangement and construction of the cutters and shovels; the front cutter $c^1$ forked above, so as to come centrally under the beam, the forked shank embracing the beam on each side, connected by a headed bolt or pivot having a screw-end and nut; an intermediate pair of cutters, $c^2$, on each side of the beam, with the shank portion of each slightly bent outward; the shanks F of the shovels D yet more bent outward, each secured by a pivot-bolt adjustable in a series of perforations in their upper portion. These shovels and cutters are so placed as to make five scores equidistant apart. The brace-rods E, with their hinged loop $e$ for embracing the shanks or cutters, may be affixed with break-pins, if desirable. In that case the stay-plates G may be attached on the top of the beam. More or less slope can be given by adjusting the rods E either by separate perforations in the end or in the beam. I also provide an adjustable stay-plate, G, with notches cut out to receive the shanks or back of the cutters. These plates are affixed to the under side of the beam, and have a slot for a headed binding-screw. There is also one or two turning-bars, I, under the beam, so placed that when the cutters or shovels are turned up this bar can be turned out to support them and the brace-rods E $e$, as shown in Fig. 2, in which position the implement is used as a cultivator.

Among young plants and trees, when it is intended for loosening up the soil, the shovels may be swung up to prevent the small plants from being covered.

A hole is shown for an additional pair of cutters, spread out as in the shanks of the shovels, and used in place of the shovels in subsoiling or deep tilling, in order to loosen the soil to a greater depth, and enable it to absorb more moisture from the atmosphere or showers, and thereby sustain plant-life in time of drouth by leaving the ground more porous.

A gauge-wheel might be applied alongside of the clevis on the beam. Such are common.

I am aware that patents have been granted for an innumerable variety of plows and cultivators; but I am not aware that the arrangement and combination, as a whole, was ever known or used substantially operating as herein specified.

What I claim as my invention, and desire to secure by Letters Patent, is—

The cutters $c^1$ $c^2$ and shovels D with their bent shanks, all connected to a single beam, B, in combination with the notched, slotted, and adjustable stay-plates G, adjustably hinged brace-rods E $e$, turning-bar I, all jointly operating substantially in the manner and for the purpose specified.

S. C. SHELLER.

Witnesses:
M. DREISBACH,
DANIEL SHAFFER.